United States Patent
Kolax et al.

(10) Patent No.: US 8,926,880 B2
(45) Date of Patent: *Jan. 6, 2015

(54) METHOD FOR MANUFACTURING A CORE COMPOSITE PROVIDED WITH COVER LAYERS ON BOTH SIDES AS WELL AS A CORE COMPOSITE

(75) Inventors: Michael Kolax, Hamburg (DE); Wolf-Dietrich Dolzinski, Ganderkeese (DE)

(73) Assignee: Airbus Operations GmbH, Hamburg (DE)

( * ) Notice: Subject to any disclaimer, the term of this patent is extended or adjusted under 35 U.S.C. 154(b) by 945 days.

This patent is subject to a terminal disclaimer.

(21) Appl. No.: 12/736,303

(22) PCT Filed: Feb. 20, 2009

(86) PCT No.: PCT/EP2009/052034
§ 371 (c)(1),
(2), (4) Date: Sep. 28, 2010

(87) PCT Pub. No.: WO2009/127461
PCT Pub. Date: Oct. 22, 2009

(65) Prior Publication Data
US 2011/0020595 A1    Jan. 27, 2011

Related U.S. Application Data

(60) Provisional application No. 61/044,914, filed on Apr. 15, 2008.

(30) Foreign Application Priority Data

Apr. 15, 2008 (DE) .......................... 10 2008 019 065

(51) Int. Cl.
*B31D 3/00* (2006.01)
*B32B 37/14* (2006.01)
*B29C 70/08* (2006.01)
*B32B 3/12* (2006.01)
*B29D 99/00* (2010.01)
*B32B 38/10* (2006.01)
*B32B 38/00* (2006.01)
*B29K 707/04* (2006.01)
*B29K 63/00* (2006.01)
*B29L 31/60* (2006.01)
*B32B 37/10* (2006.01)

(52) U.S. Cl.
CPC ............ *B29C 70/086* (2013.01); *B32B 37/146* (2013.01); *Y02T 50/433* (2013.01); *B32B 2038/008* (2013.01); *Y02T 50/43* (2013.01); *B32B 2305/188* (2013.01); *B32B 2311/00* (2013.01); *B32B 3/12* (2013.01); *B29K 2707/04* (2013.01); *B32B 2313/04* (2013.01); *B29D 99/0021* (2013.01); *B29K 2063/00* (2013.01); *B29L 2031/608* (2013.01); *B32B 2605/18* (2013.01); *B32B 37/1018* (2013.01); *B32B 38/10* (2013.01)
USPC ............................. 264/258; 264/241; 156/349

(58) Field of Classification Search
USPC .................................. 264/241, 258; 156/349
See application file for complete search history.

(56) References Cited

U.S. PATENT DOCUMENTS

| | | | |
|---|---|---|---|
| 3,996,081 A | 12/1976 | Nakata | |
| 3,996,084 A * | 12/1976 | Holmes | 156/93 |
| 4,832,999 A * | 5/1989 | Sweet | 428/116 |
| 6,291,049 B1 * | 9/2001 | Kunkel et al. | 428/99 |
| 6,592,963 B1 | 7/2003 | Levit | |
| 6,713,008 B1 | 3/2004 | Teeter | |
| 2005/0204693 A1 | 9/2005 | Endres et al. | |

FOREIGN PATENT DOCUMENTS

| | | |
|---|---|---|
| AU | 2003264650 | 1/2004 |
| AU | 2003264652 | 1/2004 |
| CN | 1436121 A | 8/2003 |
| DE | 195 21 946 | 12/1996 |
| DE | 101 46 201 | 4/2003 |
| DE | 10 2004 013 145 | 10/2005 |
| DE | 10 2004 062 895 | 6/2006 |
| DE | 10 2005 003 713 | 7/2006 |

| | | |
|---|---|---|
| DE | 10 2005 016 654 | 10/2006 |
| DE | 10 2005 030 256 | 1/2007 |
| DE | 10 2006 050 823 | 5/2008 |
| JP | 06-134319 | 5/1994 |
| RU | 2057647 | 4/1996 |
| RU | 2081267 | 6/1997 |
| WO | WO 2009/127461 | 10/2009 |

OTHER PUBLICATIONS

International Search Report for PCT/EP2009/052034, mailed May 19, 2009.
German-language Written Opinion of the International Searching Authority for PCT/EP2009/052034, mailed May 19, 2009.
German-language Examination Report for the priority application DE 102008019065.9, dated Oct. 9, 2008.
English translation of the International Preliminary Report on Patentability and Written Opinion in corresponding PCT Application PCT/EP2009/052034 mailed Nov. 18, 2010.
Chinese Search Report for Application No. 200980113109.3 dated Oct. 24, 2012.
Russian Decision to Grant for Application No. 2010146181/05(066614) dated May 28, 2012.
Japanese Notification of Reason for Refusal for Application No. 2011-504391 dated Oct. 30, 2012.

\* cited by examiner

*Primary Examiner* — Galen Hauth
(74) *Attorney, Agent, or Firm* — Jenkins, Wilson, Taylor & Hunt, P.A.

(57) ABSTRACT

The invention relates to a method for manufacturing a core composite (1, 20, 26) having a folded honeycomb core (2, 21, 29) provided on both sides with cover layers (3, 4, 22, 23, 27, 28) wherein the folded honeycomb core (2, 21, 29) has a number of drainage-enabling channels (5). First a core filler material (16, 17) is introduced into the folded honeycomb core (2, 21, 29) at least in some areas in order to provide the filler material with sufficient stability for the subsequent sewing process. The cover layers (3, 4, 22, 23, 27, 28) which are not yet impregnated with a curable plastics material are then placed on the folded honeycomb core (2, 21, 29) and stitched to this along the base lines (6 to 8) and/or apex lines (9, 10) at least in some sections by means of a sewing thread (19). The infiltration of the overall structure with a curable plastics material is then carried out followed by hardening by applying pressure and/or temperature. The core filler material (16, 17) can to complete the process be removed again completely from the folded honeycomb core (2, 21, 29) by being dissolved and washed out or by melting and flowing out. Delamination of the cover layers (3, 4, 22, 23, 27, 28) from the folded honeycomb core (2, 21, 29) is prevented by the stitching so that core composites (1, 20, 26) manufactured by the method according to the invention can be used in the primary structure of aircraft.

The invention further relates to a core composite (1, 20, 26) manufactured according to the provisions of the method.

12 Claims, 2 Drawing Sheets

METHOD FOR MANUFACTURING A CORE COMPOSITE PROVIDED WITH COVER LAYERS ON BOTH SIDES AS WELL AS A CORE COMPOSITE

This application is the U.S. national phase of International Application No. PCT/EP2009/052034 filed 20 Feb. 2009, which designated the U.S. and claims priority to DE Application No. 10 2008 019 065.9 filed 15 Apr. 2008, and this application claims priority from U.S. Provisional Application No. 61/044,914 filed 15 Apr. 2008; the entire contents of each of the above applications are hereby incorporated by reference.

The invention relates to a method for manufacturing a core composite having a folded honeycomb core provided with cover layers on both sides wherein the folded honeycomb core has a number of drainage-enabling channels running parallel to the cover layers.

Component parts which are designed in sandwich structure or as core composite have very high mechanical strengths with at the same time a very low weight. Sandwich plates are therefore used by way of example for the internal cladding of passenger cabins or as base plates on the floor framework in passenger aircraft. Sandwich plates are formed by way of example with a honeycomb-shaped core on which the cover plates are applied to both sides. Sandwich components having a honeycomb-shaped structured core are however not suitable for large-format component parts particularly because of the lack of drainage which is not provided owing to the closed-cell structure of the honeycombs. This can be remedied by using so-called folded honeycomb cores which have a number of continuous full-length channels running parallel to one another and which are therefore in a position to divert back out again any condensation water which has arisen or is forced into the folded honeycomb core.

One problem which has arisen however with both variations of sandwich component parts is their low resistance to damage. By this is meant the danger that the cover layers in certain load situations can become detached at least in some areas from the core structure and in the event of prolonged stress this delamination process furthermore shows a tendency to steadily progress. Through such delaminations the structural strength of a core composite breaks down suddenly which as a result leads to the immediate failure of the relevant component part. This last mentioned circumstance is the decisive reason for the fact that the sandwich component parts with folded honeycomb core which are ideal owing to their mechanical properties—wherein in this connection in particular the good strength-weight ratio is to be mentioned—are at the present time not considered to a noticeable extent in the primary structure of large aircraft.

The object of the invention is therefore to provide a method for manufacturing a core composite with a drainage-enabling folded honeycomb core in which an in particular progressive detachment of the cover layers is eliminated.

This is achieved according to the invention by a method having the features of patent claim 1 as well as by a core composite having a folded honeycomb core provided with cover layers on both sides according to patent claim 12. Preferred embodiments are the subject of the respective dependent claims.

The method according to the invention has the following steps:
a) Introducing a core filler material at least in some areas into the at least one folded honeycomb core
b) arranging a lower and upper dry cover layer onto the folded honeycomb core
c) mechanically bonding the cover layers to the folded honeycomb core at least in some areas
d) infusing the cover layers with a curable plastics material
e) hardening the entire core composite by applying pressure and/or temperature, and
f) removing the core filler material.

As a result of the mechanical bonding of the two cover layers to the folded honeycomb core which takes place in method step c), more particularly a progressive delamination in areas of the cover layers is reliably prevented under all operating states of the aircraft which occur. Consequently a core composite with folded honeycomb core manufactured by means of the method according to the invention is in the first place suitable unrestrictedly for use in the primary structure of an aircraft.

During the course of the method according to the invention first in step a) a core filler material is introduced at least in some areas into the at least one folded honeycomb core of the ensuing core composite. Introducing the core filler material serves to mechanically stabilise the folded honeycomb core for the mechanical bonding of the cover layers to the core structure which takes place subsequently. The core filler material is a curable material which can be removed again without residue after fabrication of the core composite by suitable solvents or the use of temperature. As core filler material can be used by way of example the material "Aqua-Core®" which is soluble in water and can thus be rinsed out from inside the core composite without residue. Alternatively low-melting wax or metal alloys can also be used as the core filler material.

In the subsequent method step b) a lower and an upper "dry" cover layer are placed on the folded honeycomb core. The cover layers are formed with the known reinforcement fibre arrangements, by way of example a carbon fibre fabric or a carbon fibre non-crimp material, wherein the term "dry" refers to the infusion which has not yet taken place with a curable plastics material such as for example an epoxy resin, a polyester resin, a phenol resin or a BMI resin. As opposed to this the folded honeycomb core is formed with a reinforcement fibre arrangement which is already impregnated with a hardened plastics material. A suitable material for the folded honeycomb core is by way of example the thus named Nomex®-paper or a carbon fibre reinforcement arrangement which is impregnated with epoxy resin and then hardened.

At this stage an adaptation to the predetermined ideal geometry of the core composite component to be manufacture is carried out.

In method step c) the mechanical bonding is carried out of the cover layers to the folded honeycomb core. Compared with the hitherto usual purely adhesive bonding a significantly higher security is obtained against progressive delamination in some areas of the cover layers from the folded honeycomb core. The core composites made according to the invention thus have a high damage tolerance which permits a problem-free use even in the primary structure of large passenger aircraft. Additionally, an additional adhesion of the folded honeycomb core to at least one of the two cover layers can be provided at least in some sections. The mechanical bonding of the lower and upper cover layers can take place at the same time or one after the other.

In the subsequent method step d) an infusion takes place of the two cover layers with a suitable curable plastics material. In order to achieve the most complete possible and uniform impregnation of the two cover layers whilst avoiding air inclusions and other undesired cavities it may be necessary to cover the complete structure with a foil at least in some areas and to intensify the infusion process by applying a vacuum.

In the following method step e) the hardening of the completed core composite is carried out by applying pressure and/or temperature wherein this process step takes place for example in a furnace or an autoclave.

In a final method step f) the core filler material is removed from the core composite. The residue-free removal of the core filler material can take place in dependence on the concretely used material by way of example by rinsing or melting it out.

According to an advantageous development of the method the core composite is provided with a geometry which deviates from a planar shape by means of at least one suitable tool prior to the mechanical bonding of the cover layers. By way of example single (cylindrical) or double (spherical) curved shell segments can hereby be manufactured according to the method to produce fuselage sections for aircraft. A fuselage section is produced by joining circumferentially several such shell segments each by producing longitudinal seams. At least four shell segments can preferably be hereby used.

According to a further development of the method the mechanical bonding of the cover layers to the folded honeycomb core takes place by stitching. A solid mechanical bond is hereby obtained in simple manner between the cover layers and the folded honeycomb core. Stitching covering the entire surface area is generally not necessary. In order to reliably stop delaminations continuing at least in some areas, stitching in at least some areas is generally sufficient. As "sewing threads" are preferably used rovings of the same material which are also used for the cover layers. In the event that the cover layers are formed by way of example with a carbon fibre woven fabric or a carbon fibre non-crimp material advantageously at least one carbon fibre roving or carbon fibre strand is used as the sewing thread. Basically however any sufficiently strong plastics fibre or any plastics yarn or any natural fibre can be used as sewing thread. For example carbon fibre rovings, polyester threads, Aramid® threads or hemp threads can be used as sewing threads. Since the sewing thread penetrates through the cover layers and the folded honeycomb core the sewing thread is secured in its relevant position by the subsequent infusion of the cover layers with a curable plastics material.

According to a further advantageous development of the method at least one cover layer is stuck at least in some areas to the folded honeycomb core. An additional security against delamination can hereby be achieved. Furthermore the position fixing of the sewing thread is improved.

According to a further development of the method the sewing and/or adhesion takes place essentially along base lines and/or apex lines of the folded honeycomb core. The positioning of the sewing head used for stitching is hereby facilitated. The position control of the sewing head can take place by way of example by an electrical conductivity increased in the area of the apex lines and/or base lines. This local increase in the conductivity can be effected for example by coating with a soluble conductive paste which is removed without residue before the resin infusion process and permits the by way of example inductive guidance of the sewing head along the base lines and the apex lines of the folded honeycomb core. As an alternative the path of the channels can also be laid down in a CNC control by means of which the sewing head is then guided computer-controlled.

Whilst the sewing process is being undertaken the full-length drainage-enabling channels of the folded honeycomb core are filled out at least in areas with the core filler material for mechanical stabilization. A sewing head which can be freely positioned in the area serves for guiding the needle and sewing thread. A round needle is preferably used as the needle in order that the sewing process can be carried out from one side of the core composite. Penetration of the folded honeycomb core takes place by means of the needle by way of example in the area of the apex lines or the base lines and at least one cover layer. The strength of the seam can be further increased by additionally knotting the sewing thread in itself by forming a loop. Basically both cover layers can be bonded to the folded honeycomb core in one sewing process. Alternatively only the upper cover layer is stitched and after turning the core composite the lower cover layer is then stitched to the folded honeycomb core. Where applicable it may be necessary to provide additional fastening means (needles, adhesive spots, adhesive tape etc) prior to the stitching process to fix the position of the cover layers and/or folded honeycomb core in relation to one another.

In a continuation of the method the folded honeycomb core has at least in some sections flanges in the area of the base lines and/or the apex lines wherein the flanges are stitched to the cover layers. This produces a larger connecting surface area between the folded honeycomb core and the cover layers and consequently a higher load capacity. Furthermore it is possible by means of the flanges which are preferably arranged on both sides to let the seam run on both sides of the apex line and/or the base lines. The flanges are preferably formed in one piece by "bending over" on both sides and extend on both sides horizontally to the apex lines or base lines of the folded honeycomb core, each parallel to the lower or upper cover layer. In order to prevent a drape it may be necessary to provide the flanges in the case of folded honeycomb cores having trapezoidal, zigzag or sinusoidal running apex lines and base lines and continuous channels in sections with a number of uniformly spaced out incisions. The incisions are in the case of the zigzag or trapezoidal running channels inserted into the flanges particularly in the base of the bend points of the base lines and apex lines (change of direction of the relevant line).

In a further development of the method the core composite is given a substantially shell segment shaped geometry.

The complete fuselage section is then completed by bringing together several, more particularly at least four, such shell segments by forming longitudinally aligned longitudinal seams.

According to a further advantageous development the core compound is given a substantially hollow cylindrical geometry. It is hereby possible to produce a complete fuselage section in the integral construction method with the core composite according to the invention with folded honeycomb core so that weight-increasing longitudinal seams which arise when making up a fuselage section from several shell segments can be omitted without replacement.

The core composite according to the invention comprises a folded honeycomb core provided on both sides with cover layers and having drainage-enabling channels running parallel to the cover layers.

In that the cover layers are mechanically connected, more particularly stitched, in the area of the apex lines and/or base lines at least in sections to the folded honeycomb core, a high damage tolerance of a component part constructed with the core composite according to the invention is produced. In particular progressive delaminations of the cover layers from the folded honeycomb core are avoided so that the core composite is suitable unrestrictedly for use within the primary structure of a commercial aircraft.

Further features and advantages of the invention are apparent from the following description of preferred embodiments of the invention in which reference is made to the accompanying drawings.

FIG. 1 shows in a perspective view a shell segment formed with a core composite stitched according to the method according to the invention for manufacturing an aircraft fuselage section.

Figure 1:
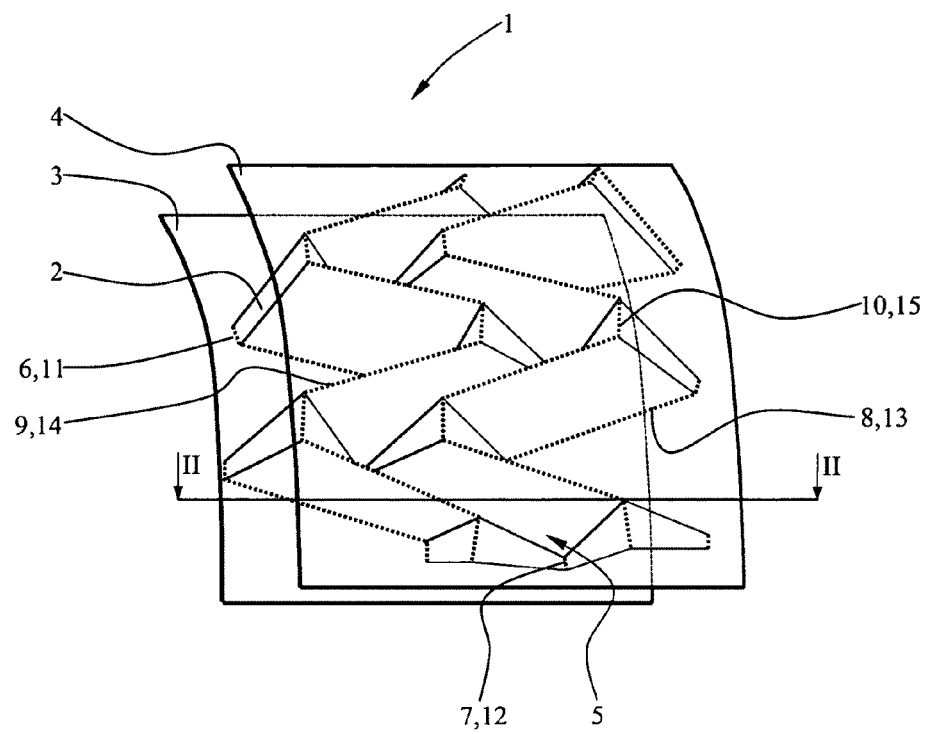
FIG. 1 shows in perspective view a shell segment formed with a stitched core composite for an aircraft fuselage section.

A core composite 1 is formed inter alia with a folded honeycomb core 2 on which a lower and upper cover layer 3, 4 are applied. The folded honeycomb core 2 has a number of full-length drainage-enabling channels which are each configured corresponding to a zigzag-shaped channel 5. The folded honeycomb core 2 is defined at the bottom by three base lines 6 to 8 whilst the two apex lines 9, 10 define the folded honeycomb core 2 at the top. Both the base lines 6 to 8 and also the apex lines 9, 10 run in repeat zigzag units but can however also run trapezoidal, approximately rectangular or sinusoidal by way of example. The folded honeycomb core 2 continues on in all directions of the drawing. The core composite 1 has in the embodiment of FIG. 1 an approximately single curved (hollow cylindrical) three-dimensional shape but can however also have a double curve (spherical) or can be designed as a flat plate.

The cover layers 3, 4 are formed by way of example with a woven carbon fibre fabric or non-crimp carbon fibre material and infiltrated with an epoxy resin. The folded honeycomb core 2 is preferably formed with Nomex®-paper but can however also be made for example with any carbon fibre reinforcement arrangement (woven or non-crimp material) which is impregnated with a curable thermosetting plastics material such as an epoxy resin, a polyester resin, a phenol resin or a BMI resin. The two cover layers 3, 4 are stitched to the folded honeycomb core by the method according to the invention along the base lines 6 to 8 as well as the apex lines 9, 10, as shown by the dotted lines. To produce the illustrated three-dimensional structure the folded honeycomb core 2 is folded opposite each other along the base and apex lines 6 to 10. This hereby produces three base seams 11 to 13 and two apex seams 14 and 15 in the area of the base and apex lines 6 to 10 respectively. The same material should preferably be used for the sewing thread as also serves for the reinforcement fibre inside the cover layers 3, 4 and the folded honeycomb core 2. This produces a particularly good anchorage of the sewing thread in the resin matrix of the cover layers 3, 4.

As a result of stitching the cover layers 3, 4 to the folded honeycomb core 2 a progressive delamination of the cover layers 3, 4 from the folded honeycomb core 2—as may occur in the case of a purely adhesive connection—is practically ruled out. The base lines 6 to 8 and the apex lines 9, 10 need not be stitched throughout to the folded honeycomb core 2. As a rule spot stitching in a uniform grid spacing of by way of example 10 cm over the entire surface area of the core composite 1 is generally sufficient to reliably counteract the risk of the cover layers 3, 4 becoming detached in some areas from the folded honeycomb core 2. The core composite 1 can hereby be used without any additional adaptation as a structural component part, for example as a shell segment for forming a fuselage section for a large aircraft.

Figure 2:
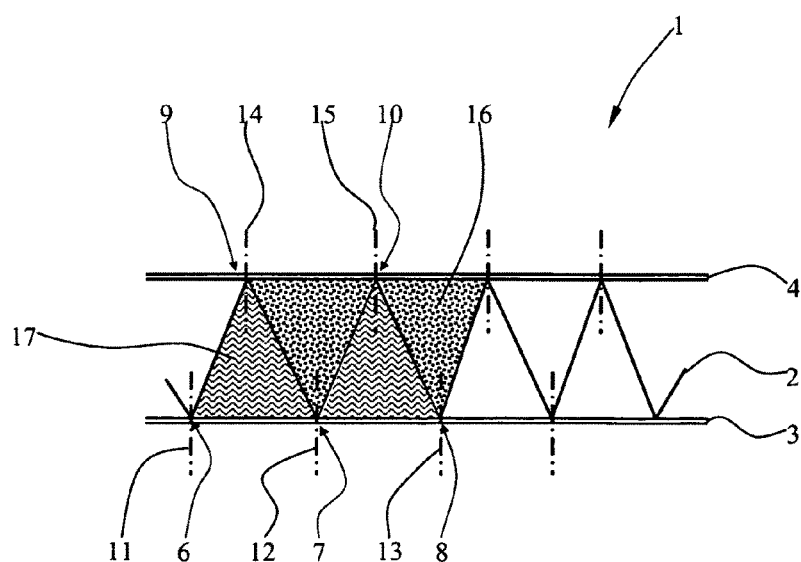
FIG. 2 shows diagrammatically a cross-section through the core composite according to FIG. 1 with inserted core filler material and symbolised seam path.

The method procedure is more apparent from FIG. 2 which shows a diagrammatic cross section through an extended core composite according to the stipulations of FIG. 1 with a core filler material already partially introduced.

In the first method step a) a core filler material 16, 17 is introduced into the channels of the folded honeycomb core 2. The core filler material 16, 17 can be a curable material which can be removed again without residue from the core composite 1 once this has been fabricated. As core filler material 16, 17 can be used for example the material AquaCore® which can be rinsed out again from the folded honeycomb core 2 using conventional water as the solvent. Consequently no weight-increasing constituent parts remain in the core composite.

In the following method step b) the initially still "dry" lower and upper cover layers 3, 4 are positioned on the folded honeycomb core 2, that is, are not yet stitched. The term "dry" means in this context that the reinforcement fibre arrangement of the cover layers 3, 4 which can be by way of example a carbon fibre woven material or a carbon fibre non-crimp material, has not yet been impregnated with the curable plastics material. At this method stage—so long as the core filler material 16, 17 has not yet completely hardened—the core composite 1 which is to be manufactured can be given a predetermined ideal geometry which deviates from the illustrated flat configuration and to which again the three-dimensional shape of the folded honeycomb core 2 is already adapted from the manufacturer's side. This can happen by way of example by a correspondingly shaped support table and/or a contact pressure plate corresponding to the ideal geometry for shaping and mechanically supporting the folded honeycomb core structure 2. Through the core filler material 16, 17 it is ensured that no undefined deformation of the folded honeycomb core 2 can take place through the following process of mechanically bonding the cover layers 3, 4 to the folded honeycomb core 2.

After the core filler material 16, 17 has completely hardened in the folded honeycomb core, in method step c) the at least in some areas mechanical bonding of the cover layers 3, 4 to the folded honeycomb core 2 takes place which is preferably carried out by conventional stitching of the said components. The stitching takes place for example by a sewing head (not shown) which can be freely positioned in space and has at least one round needle for receiving a suitable sewing thread. The folded honeycomb core 2 is preferably stitched to the cover layers 3, 4 in the area of the apex lines 9, 10 as well as the base lines 6 to 8, as shown by the vertical chain-dotted base and apex lines 11 to 15. It is hereby sufficient to stitch the folded honeycomb core 2 and cover layers 3, 4 together only in some areas.

After stitching the folded honeycomb core 2 to the two cover layers 3, 4 has been completed, in method step d) the infusion of the core composite 1 with a curable plastics material, by way of example an epoxy resin, is carried out by means of a conventional resin infusion process by applying a vacuum. The sewing thread is hereby impregnated with this at the same time whereby a mechanically extremely high tensile bond is produced between the cover layers 3, 4 and the folded honeycomb core 2. In particular a progressive delamination of the cover layers 3, 4 from the folded honeycomb core 2 is hereby also ruled out even under extreme load conditions in flight operation. The resin infusion of the core composite 1 can take place by way of example by using a foil for cover which to accelerate and even out the infiltration process is impinged with sufficient underpressure.

Then in method step e) the complete structure is hardened by simultaneously using pressure and/or temperature which can take place by way of example in a conventional oven or in an autoclave.

To fabricate the core composite 1, in the last method step f) the core filler material 16, 17 is removed from all the cavities and channels of the folded honeycomb core 2. In the event that a wax-type substance or a low melting metal alloy is used as the core filler material 16, 17, the removal of the core filler material 16, 17 can also be carried out by heating so that it flows out automatically through the effect of gravity. In order to speed up the process through the action of centrifugal forces the core composite can in some circumstances also be set in rapid rotation.

Figure 3:
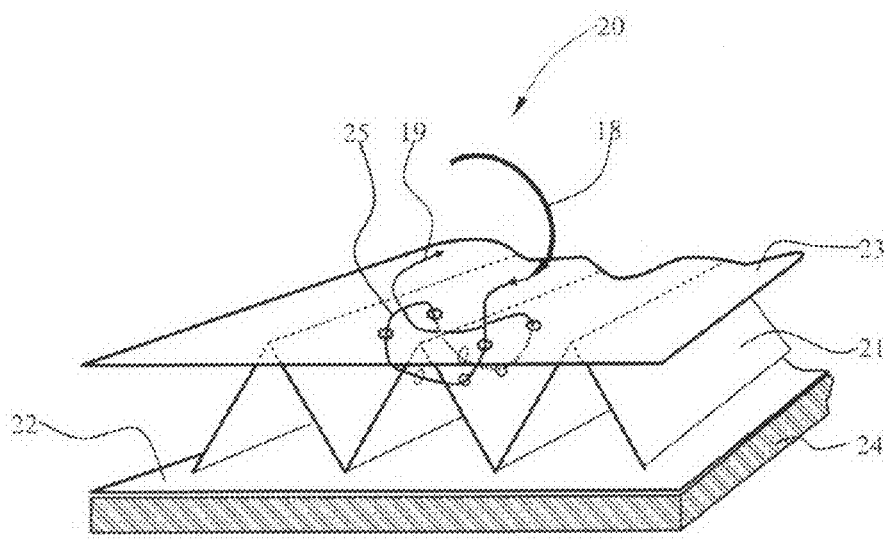
FIG. 3 shows a principle illustration of the sewing process with a round needle.

FIG. 3 shows the principle plan of the sewing process with a round needle.

A round needle 18 is attached for swivel movement to a sewing head (not shown). The round needle 18 serves to guide a sewing thread 19 and the penetration of the core composite. The round needle 18 can be positioned in at least six axes in space by means of a number of actuators (not shown) whereby the actuators are controlled by a control and regulator mechanism. The movement of the round needle 18 can hereby take place similar to the one-sided hand sewing process.

A core composite 20 comprises a folded honeycomb core 21 which is provided on both sides with cover layers 22, 23 which run parallel to one another (see FIGS. 1, 2). The folded honeycomb core 21 is for carrying out the sewing process preferably filled out with a suitable core filler material for stabilisation which for an improved overview is not shown. The core composite 20 rests on a preferably metal solid (moulding) tool 24 in order to provide the core composite 20 with a defined geometry. The tool 24 which in the illustrated embodiment has a flat geometrical configuration can alternatively also be shaped single or two dimensionally (spherical) curved. The tool is not necessary when there is sufficient inherent rigidity in the folded honeycomb core which is filled out at least in some areas with the core filler material.

After the round needle 18 with the sewing thread 19 has pierced through the upper cover layer 23 including the folded honeycomb core 21 at two puncture points each—as symbolised by the small ellipses and circles respectively—and has emerged completely from the upper cover layer 23, the round needle 18 is "turned round" by means of a suitable holder on the sewing head and penetrates the upper cover layer 23 including the folded honeycomb core 21 correspondingly, only in the reversed direction, until the round needle 18 has again emerged completely from the core composite 20 by forming four further puncture points, likewise illustrated by ellipses, in the folded honeycomb core 21 and in the upper cover layer 23. A loop 25 is hereby formed above the cover layer 23 through which the sewing thread 19 is guided and then tightened by means of the needle 18. The durability of the resulting seam prior to the impregnation of the cover layers 22, 23 can be improved when necessary by coating the sewing thread 19 with adhesive. The running direction of the sewing thread 19 through the core composite 20 is shown by the two direction arrows at the end of the sewing thread 19.

This loop-forming process is repeated periodically until the stitching along the apex lines of the folded honeycomb core 2 has been fully completed whereby the sewing head is guided along a predetermined path. The sewing process is continued at least in sections along the remaining apex lines. The stitching of the base lines of the folded honeycomb core 21 to the lower cover layer 22 can take place with this sewing method only after turning round the core composite on the tool 24. The sewing process which is illustrated above as an example is only one of many alternative types of seam formation which are possible.

Instead of the round needle 18 a conventional straight needle can also be used. In this case the two cover layers 22, 23 are pierced through one after the other whereby the sewing thread 19 runs each time roughly perpendicularly between the cover layers 22, 23 and pierces the folded honeycomb core 21 once in an area between the apex lines and the base lines, that is in the area of the inclined flanks of the folded honeycomb core 21. Finally the folded honeycomb core 21 can be stuck to the cover layers 22, 23 additionally at least in some sections in the area of the apex lines as well as the base lines. In this method variation an intermediate layer formed with an elastomer (rubber mat) is mounted underneath the cover composite 20 between the supporting tool and the core composite 20 in order to prevent damage to the needle piercing through the lower cover layer 22 from the tool 24 which is underneath.

Figure 4:
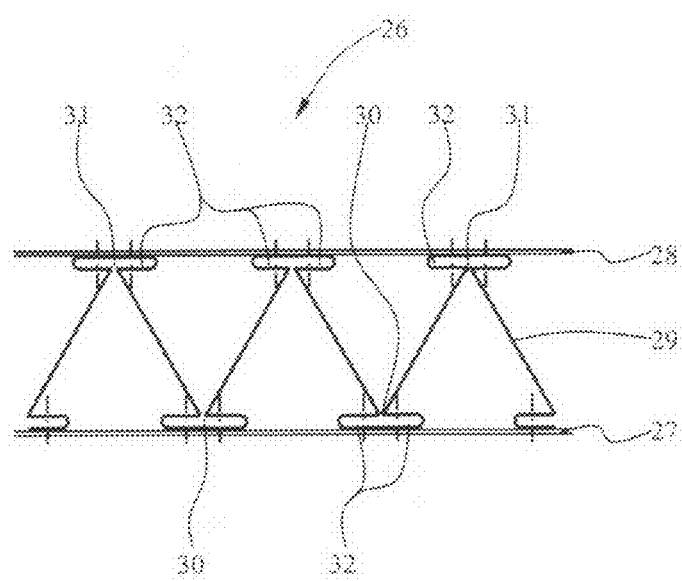
FIG. 4 shows an alternative configuration of a folded honeycomb core with folded flanges.

FIG. 4 shows an alternative embodiment of a folded honeycomb core with flanges for stitching to the cover layers of the core composite.

A core composite 26 comprises two cover layers 27, 28 which cover a folded honeycomb core 29 on both sides. As opposed to the previous folded honeycomb cores the folded honeycomb core 29 has in the areas of the base lines 30 as well as apex lines 31 a flange 32 extending horizontally evenly on both sides. The flanges 32 are produced during the manufacturing process of the folded honeycomb core 29 by repeated folding. The flanges 32 increase the bonding surface area or connecting surface area between the cover layers 27, 28 and the folded honeycomb core 29 which is particularly advantageous for any additional adhesion and/or stitching which may be carried out.

Furthermore the flanges 32 make it possible that stitching can be carried out on both sides of the base lines 30 and apex lines 31, as indicated by the perpendicularly aligned chain-dotted lines, whereby the mechanical bearing strength of the connection between the folded honeycomb core 29 and the cover layers 27, 28 carried out according to the invention by stitching, is further improved.

REFERENCE NUMERALS

1 Core composite (single curve)
2 Folded honeycomb core
3 Lower cover layer
4 Upper cover layer
5 Channel (full-length, drainage-enabling)
6 Base line
7 Base line
8 Base line
9 Apex line
10 Apex line
11 Base seam
12 Base seam
13 Base seam
14 Apex seam
15 Apex seam
16 Core filler material
17 Core filler material
18 Round needle (pivotal)
19 Sewing thread
20 Core composite
21 Folded honeycomb core
22 Lower cover layer
23 Upper cover layer
24 Tool (bearing support surface)
25 Loop
26 Core composite
27 Lower cover layer 28 Upper cover layer
29 Folded honeycomb core
30 Base line
31 Apex line
32 Flange

The invention claimed is:

1. Method for manufacturing a core composite having a folded honeycomb core provided on both sides with cover layers wherein the folded honeycomb core has a number of drainage-enabling channels running parallel to the cover layers, comprising:
   a) bending round the apex lines of the folded honeycomb core so that substantially horizontally aligned flanges are formed at the apex lines of the folded honeycomb core;
   b) introducing a core filler material at least in some areas into the at least one folded honeycomb core;
   c) arranging a lower and an upper cover dry cover layer on the folded honeycomb core;
   d) mechanically bonding the cover layers at least in some areas to the flanges of the folded honeycomb core;
   e) infusing the cover layers with a curable plastics material;
   f) hardening the entire core composite by applying pressure and/or temperature; and
   g) removing the core filler material.

2. Method according to claim 1 characterised in that the core composite is provided with a geometry deviating from a flat configuration by means of at least one tool prior to the bonding of the cover layers.

3. Method according to claim 1 characterised in that the mechanical bonding of the cover layers to the folded honeycomb core is carried out by stitching.

4. Method according to claim 1 characterised in that at least one cover layer is stuck to the folded honeycomb core at least in some areas.

5. Method according to claim 3 characterised in that the stitching and/or sticking takes place substantially along the base lines and/or apex lines of the folded honeycomb core.

6. Method according to claim 1 characterised in that the core composite is given a substantially shell segment shaped geometry in order to form a composite aircraft fuselage section.

7. Method according to claim 1 characterised in that the core composite is given a substantially hollow cylindrical geometry in order to form a one-piece aircraft fuselage section.

8. Method according to claim 1 characterised in that the folded honeycomb core is impregnated with a hardened plastics material and is formed with a multi-folded reinforcement arrangement.

9. Method according to claim 1 characterised in that the core filler material is removed from the folded honeycomb core by melting or dissolving by means of a solvent.

10. Method according to claim 1 characterised in that the cover layers are formed with a laminar reinforcement fibre arrangement, and the infusion of the cover layers is with an epoxy resin.

11. Method according to claim 10 characterised in that the laminar reinforcement fibre arrangement comprises at least one of a carbon fibre woven material and a carbon fibre non-crimp material.

12. Method according to claim 10 characterised in that infusion of the cover layers is in a vacuum process.

* * * * *